United States Patent

[11] 3,599,070

| [72] | Inventors | Howard Davis<br>Canoga Park;<br>Jerry J. Silvers, Los Angeles, both of, Calif. |
|---|---|---|
| [21] | Appl No. | 858,751 |
| [22] | Filed | Sept. 17, 1969 |
| [45] | Patented | Aug. 10, 1971 |
| [73] | Assignee | Siltron, a division of Lighting Corporation of America |

[54] BATTERY CHARGER AND EMERGENCY POWER SUPPLY FOR ILLUMINATION DEVICE
8 Claims, 4 Drawing Figs.

[52] U.S. Cl. .................... 320/5, 307/66, 315/86, 320/29, 320/32
[51] Int. Cl. .................... H02j 7/10
[50] Field of Search............ 307/64–66, 130, 131, 155; 320/5, 9, 10, 13, 14, 79, 32, 33, 39, 40; 315/86

[56] References Cited
UNITED STATES PATENTS

| 3,486,068 | 12/1969 | Dunn et al. | 315/86 X |
| 2,716,706 | 8/1955 | Palmer | 320/5 |
| 3,324,304 | 6/1967 | Duncan | 307/66 |
| 3,308,306 | 3/1967 | Bagno | 320/5 |
| 3,341,764 | 9/1967 | Kongable | 307/66 (UX) |
| 3,348,060 | 10/1967 | Jamieson | 307/66 |
| 3,387,141 | 6/1968 | Howald | 307/66 |
| 3,389,324 | 6/1968 | Ballman | 320/40 |
| 3,418,487 | 12/1968 | Livingston | 320/5 |

Primary Examiner—J. D. Miller
Assistant Examiner—John M. Gunther
Attorney—Finkelstein and Mueth ABSTRACT: An improved battery charger and power supply arrangement for illumination devices is provided to power the same illumination device under both a normal operating condition from standard line power, and an emergency operating condition in the absence of line power, from a self-contained battery. The emergency operating condition occurs when the magnitude of the voltage in the line comprising the primary source of electrical energy drops below a preselected value and semiconductor devices are utilized to provide automatic switching at this time to the emergency mode of operation. In the emergency mode of operation the battery is utilized to power the illumination device and the unit contains circuitry for allowing battery charging from the primary source of electrical energy during normal operation and automatic switching to effectively terminate the battery charging function during an emergency operation. There is also achieved switching by means of a voltage controlled signal from the primary source of electrical energy during normal operation to the power from the battery during emergency operation. No mechanical parts are utilized and all operations are achieved by electrical means.

INVENTORS
JERRY J. SILVERS
HOWARD DAVIS
BY
Don Finkelstein
ATTORNEYS

BATTERY CHARGER AND EMERGENCY POWER SUPPLY FOR ILLUMINATION DEVICE

BACKGROUND OF THE INVENTION

1. Field of the Invention

This invention relates to the electrical power supply art and more particularly to an improved combined emergency power supply and battery charging arrangement for both incandescent and a gas discharge-type illumination device.

2. Description of the Prior Art

In many applications it is necessary to have an emergency source of illumination for providing desired and/or necessary illumination in specific areas in the event that there is a failure somewhere in the overall system incorporating the normal illumination devices. Additionally, certain state and/or federal laws require that in certain installations there be provided such emergency illumination devices. Such applications, of course, include hospitals, stairwells, emergency exit signs, and the like. With the advent of more and more buildings and structures such as high-rise office and/or apartment buildings in which there is little if any natural sunlight provided to many areas, it is, of course, obvious that artificial illumination devices such as incandescent lamps or various types of gas discharge lamps such as mercury arc, florescent bulb and the like are necessary to provide illumination.

Such illumination devices, in general, receive their power directly from the usual line power supply to the building or other facility. Since most buildings do not have their own generating plants, they are dependent upon the electric energy of the line power supply from some large electric generating station and the associated controls and transmission lines.

In the event there is a failure in some aspect of the electric energy supply generating and distribution system, then electrical energy power to the illumination devices is terminated and the need for the emergency power for the illuminating devices become necessary. It will be appreciated, of course, that the failure of the normal illumination device itself, such as a filament incandescent lamp burning out or a fluorescent-type burning out, can cause a loss of illumination but adjacent illumination devices often provide sufficient illumination so that the situation cannot be termed an emergency and there is sufficient illumination to allow convenient repair and/or replacement of the faulty illumination device itself.

Therefore, in general, emergency power supplies heretofore utilized have generally incorporated a sensing means for detecting and sensing the voltage in the primary source of electric energy, such as the line power supply to a building, and, when the value thereof decreases below a predetermined value, turning on their own separate, self-contained illumination device for operation by a battery stored therein. Such devices have often also provided for charging of the battery during normal operation when the self-contained emergency light in the emergency power unit was not being utilized.

Thus, such prior art devices incorporated not only the above-described sensing and detecting circuits and battery, but also their own illumination device which, then, was in addition to the normal illumination device.

Additionally, many prior art emergency power supply units utilized in the past have incorporated mechanical switches and/or relays to achieve the switching between the emergency mode of operation wherein the battery powers the self-contained illumination device and a normal mode of operation wherein the illumination device is not energized and the self-contained battery is being recharged. In the event that the line voltage decreases to a "dim-out" level, that is, not completely off, but fluctuating at or around the preselected value, such fluctuations can be extremely rapid causing such mechanical switches and relays to operate at a very high frequency rate often leading to their self-destruction in comparatively short time. Further, the battery charging circuitry utilized in such prior art emergency power supplies often did not limit the current through the battery. Often, the in-rush current during the charging operation drastically reduced the battery life. Battery life during the emergency mode was often shortened because, during the charging cycle, the full voltage necessary for charging the battery was not available from the line supply and a constant voltage charging arrangement was not provided.

Since, as noted above, the need for emergency illumination generally occurs when there is a failure in the supply of electrical energy from the primary electrical energy source to the illumination device, rather than a failure of the illumination device itself, there has long been a need for an improved emergency power supply arrangement that utilizes the same normally operated illumination devices also for the emergency illumination by supplying power from a self contained battery, rather than by supplying additional illumination devices.

While incandescent lamps can be cycled in operation, at comparatively rapid fluctuations, it is apparent that gas discharge lamps such as fluorescent bulbs and more particularly mercury vapor arc lamps cannot be so operated and often, in such lamps, a loss of power for even a fraction of a second can prohibit restarting such a gas discharge lamp for up to fifteen or twenty minutes or more. Therefore, in such a new and improved emergency power supply it is both desirable and necessary that the primary electrical energy source of voltage be continuously monitored and when it drops below the preselected level necessary for satisfactory operation of the illumination devices, the improved power supply must simultaneously switch from the normal mode of operation, wherein the illumination devices are energized by energy from the primary source of electrical energy to the emergency mode of operation, wherein the illumination devices are energized by electrical energy from a self-contained battery within the emergency power supply.

Additionally, to prevent any possible interference with the power to the illumination devices during emergency mode, it is desirable to terminate substantially the battery charging operation during emergency operation under certain conditions such as when the primary power voltage drops to a value that is too low to put a charge on the battery. Additionally, it is desirable to only allow battery charging with a controlled voltage and controlled current. For the reason noted above, it is preferred that such switching be achieved by a nonmechanical means to avoid the self-destruction occasioned by high frequency switching rates under certain operating conditions. It is also desirable to have the illumination device return to normal operation as the line voltage increases to a predetermined voltage greater than the preselected voltage, above described. This difference in voltage level of the line power required for switching prevents undue cycling and fluctuation during "dim-out" conditions thereby improving battery life

BRIEF DESCRIPTION OF THE INVENTION

The above and other desiderata are achieved in a preferred embodiment of applicants' invention, by providing an emergency power supply having a self-contained source of electrical energy, which in general may be a battery. The improved emergency power supply arrangement is utilized in conjunction with any type of electrical load, such as an illumination device which may be an incandescent lamp or lamps, a gas discharge lamp together with the associated ballast arrangement therefor, or any other type of electrical load. The same illumination devices are utilized both during normal and emergency operation. A control means generally comprising a transformer and a rectifier-filter is provided in the power supply arrangement for receiving the electrical energy from the primary electrical energy source. The control means provides a first and a second controlled voltage output signal from the line voltage in the primary electrical energy supply. The first of these voltage controlled, e.g. a stepdown from 120 v. AC to 11.5 v. DC output signals is utilized as a power output signal to the illumination device for energizing thereof during normal operation wherein the voltage in the primary electrical energy source is above the preselected voltage level. The second of these voltage controlled, e.g. a stepdown from 120 v. AC to 18 v. DC, output signals is utilized as a voltage controlled battery charging signal for charging the self-contained battery during normal operation.

To prevent damage to the battery from in-rush current effects, as well as long term overcharging effects, in a preferred embodiment of the invention, there is provided a current control means as well as a selectively operated voltage regulating means in the second voltage controlled battery charging circuit. These means limit the maximum current that will be applied to the battery during the charging thereof and prevent prolonged charging beyond the fully charged condition of the battery.

A first switch means which, in the preferred embodiments of the invention is a semiconductor electronic switch, controls the first voltage controlled power signal for allowing transmission of the power signal to the illumination device during normal operation when the first switch is in a transmission condition and the first switch means blocks the first voltage control signal during emergency operation for the first switch means in a blocking condition.

A second switch means, which, in functional effect, in the preferred embodiments of the invention, is also a semiconductor electronic switch, controls the battery charging signal to transmit the battery charging signal to the battery in the transmission condition but to block, effectively, the battery charging signal when the second switch is in the blocking condition.

A third switch means which, in the preferred embodiments of the invention, is also a semiconductor electronic switch, controls the emergency power electrical energy signal output from the battery for transmitting the emergency electrical energy signal to the illumination device in a transmission condition during emergency operation and for blocking the emergency electrical energy signal in a blocking condition during normal operation.

A sensing and detection means for sensing the magnitude of the voltage in the primary source of electrical energy is provided and the sensing and detecting means controls the operation of the first, second and third switches in response to the detected voltage and in response to the battery charge condition.

In order to achieve the desired operation in the invention, the sensing of the voltage level in the primary source of electrical energy as well as the battery charge condition, is performed continuously. If the line voltage should drop below the preselected level, then simultaneously there are several functions that occur. The first switch means is switched from the transmission to the blocking condition, the second switch means is switched, if the battery condition is such that charging is not possible, from the transmission to the blocking condition and the third switch means is switched from the blocking condition to the transmission condition. There is provided circuitry controls to ensure that such operation of the switches occurs substantially simultaneously with the decrease of the magnitude of the voltage in the primary source of electrical energy below the preselected value. Conversely, when the voltage in the line rises above the preselected value, circuitry is provided so that switching of switches one, two and three will not occur until the line voltage reaches a predetermined value greater than the preselected value.

The illumination devices, as utilized in the description of the operation of the invention herein, are then powered during the emergency condition by the battery and will remain powered thereby until the energy in the battery has been depleted.

When the line voltage in the primary source of electrical energy rises above the predetermined value, then the first and second switches are switched, effectively, to their transmission condition, from their blocking condition, and the third switch means is switched from its transmission condition to its blocking condition. Therefore, the illumination device is once again powered by the first voltage control power output signal from the control means and the battery is recharged with a controlled voltage and controlled current signal, if the battery condition so requires.

There is also achieved, in the preferred embodiments of the invention, a comparatively lightweight and small packaging arrangement by utilizing improved packaging techniques and high-heat transfer paths from the semiconductor devices preferred by applicants herein. Additionally, many of the semiconductor components utilized in the circuitry to provide the above described functions are utilized in dual or even tertiary manners so that they perform more than one function. This, according to their characteristics, helps achieve greater stability and certainty of operation as well as minimizing weight and cost.

Accordingly, it is an object of the invention as herein described to provide an improved battery charging and power supply arrangement.

It is another object of the invention herein to provide an improved battery charging and power supply arrangement for operation of incandescent and/or gas discharge illumination devices during both normal and emergency conditions without interruption of the illumination function thereof.

It is yet another object of the invention herein to provide a highly reliable, comparatively low cost and low maintenance-free unit that is adaptable for installation into both existing as well as new illumination circuits for achieving both normal and emergency power operation thereof and eliminating utilization of separate illumination devices during normal and emergency operation.

BRIEF DESCRIPTION OF THE DRAWINGS

The above preferred embodiments of the invention and other embodiments thereof are disclosed more fully in the following detailed description taken together with the accompanying drawings wherein similar reference characters refer to similar elements throughout and in which.

It will be appreciated by those skilled in the art that there has been described and illustrated a preferred embodiment of the invention and particular components and environments in which the embodiment is adapted to operate have been selected for convenience in describing the aspects of the invention herein. Thus, many variations to preferred embodiments may be made by those skilled in the art to achieve obvious modifications of the invention and, additionally, the invention as described herein may be utilized in many other applications where the desired functional relationships provide the necessary operation.

DESCRIPTION OF THE PREFERRED EMBODIMENTS

Figure 1:
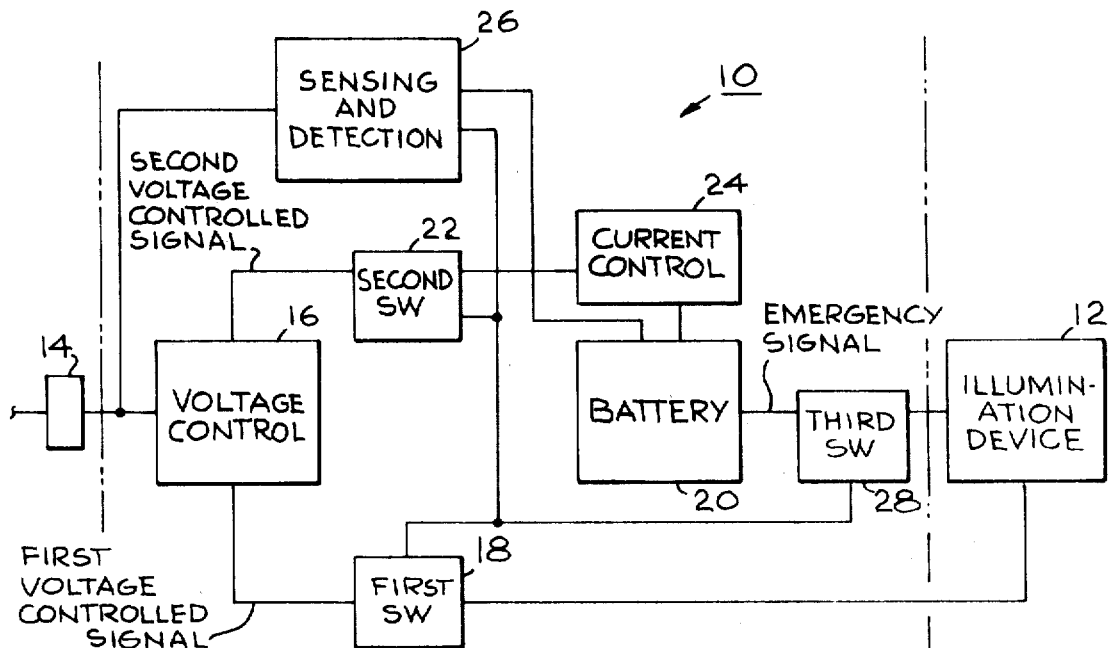
FIG. 1 is a functional block diagram illustrating the functions of one embodiment of the invention.

Referring now to FIG. 1, there is shown a functional block diagram of a preferred embodiment of the invention. Since, as noted above, one of the features of the invention herein is utilization of its components for a plurality of purposes, it will be appreciated that, as described below in greater detail in connection with FIG. 2, certain of the functional operations are performed by the same structure operating in preselected manners.

As shown on FIG. 1, there is illustrated the functional structure of a preferred embodiment of the invention, generally designated 10, as utilized to provide electrical energy to illumination device 12. Illumination device 12 may be one or more incandescent lamps, such as 12 v. incandescent lamps, or one or more gas discharge lamps and/or associated circuitry. That is, many gas discharge lamps require a ballast or other similar structure in their circuitry for proper operation.

The gas discharge lamps may be fluorescent tube type, mercury vapor arc lamps, or the like.

Electrical energy for the illumination device 12 is obtained, in normal operation, from a primary electrical energy source 14, which, for example, may comprise the line power supplying a building or other structure in which the illumination device 12 is utilized.

The improved battery charger and power supply circuitry is between the primary electrical energy source 14 and the illumination device 12 and provides the electrical energy to the same illumination device 12 in both a normal mode of operation, wherein the voltage at the primary voltage electrical energy 14 is above a preselected value and also in an emergency mode of operation wherein the voltage at the primary electrical energy source 14 is below the preselected value, in the condition of a decreasing line power supply voltage.

There is provided a voltage control means 16 that receives electrical energy from the primary electrical energy source 14, which usually is an AC signal, and provides two voltage controlled output signals. A first of the voltage control signals may be considered a power output signal which is supplied to the illumination of device 12 through first switch 18 and for a 120 v. AC line voltage may be an 11.5 v. DC signal. The second voltage controlled signal may be considered a battery charging signal and is utilized to charge a battery 20 through second switch 22 and current control 24 and, for a 120 v. AC line voltage, may be an 18 v. DC signal. The second voltage controlled signal, together with current and voltage regulation means, described below, ensures that the battery 20 receives a preselected, programmed voltage and current charging signal despite variations in the voltage level of the primary source electrical energy 14. The battery 20 may be, for a 120 v. AC line voltage and 12 v. illumination device 12, a nominal 12 v. battery. The current control 24 prevents dangerous in-rush currents to the battery 20 during the charging operation.

A sensing and detection means 26 continuously monitors and detects the magnitude of the voltage of the primary electrical energy source 14 and, when this magnitude drops below a preselected value, it operates first switch 18, and third switch 28. Sensing and detection means 26 also monitors the battery 20 charge condition for selective operation of the function of second switch 22. Thus sensing and detection means 26 also comprises a control means portion for selective operation of the functions of first switch 18, second switch 22 and third switch 28 in response to the detected voltage values. It will be appreciated, that many of the structural elements forming part of the sensing and detection means 26, in accordance with the principles of the invention herein, are utilized for dual or tertiary purposes and also provide other functions such as being part of one or more of the first switch 18, second switch 22, third switch 28, voltage control 16 or the like.

Third switch 28 is connected between the battery 20 and the illumination device 12 to control the emergency electrical energy signal output from the battery 20 to the illumination device 12 for utilization during emergency mode of operation when the magnitude of voltage at the primary source electrical energy 14 drops below a preselected value.

In operation, the sensing and detection means 26 continuously monitors the magnitude of the voltage of the primary source of electrical energy 14 and the battery 20 condition. When the line voltage drops below the preselected value, the control means portion of sensing and detection means 26 actuates first switch 18 from a transmission condition to a blocking condition to block the power output signal from the illumination device 12. Simultaneously, depending on battery charge condition, the control means portion of sensing and detection means 26 actuates the functional equivalent of second switch 22 to change from a transmission condition to a blocking condition to block the battery charging signal from the voltage control 16 to the battery 20 if charging is not necessary and/or impossible at voltage available therefor, and, also simultaneously, the control means portion of sensing and detection means 26 actuates third switch 28 from a blocking condition, wherein the emergency signal from the battery 20 to the illumination device 12 is not transmitted, to a transmission condition wherein the battery 20 powers the illumination device 12 through the emergency electrical energy signal output thereof. It will be appreciated that during emergency operation, the current drain on the battery could be on the order of 3 amps for the illumination device 12, and the current controlled charging signal a maximum of 800 milliamps. Thus, effectively there is virtually no battery charging during emergency operation. Sensing and detection means 26 continues to monitor the magnitude of the voltage of the primary source electrical energy 14, battery 20 charge condition and, when the magnitude of the line voltage rises to a predetermined voltage above the preselected value, sensing and detection means 26 again operates the first switch 18, the functional equivalent of second switch 22, and third switch 28 to change the first switch 18 from the blocking condition to the transmission condition, to change the effectivity of the function of second switch 22 from the blocking condition to the transmission condition depending on battery charge condition and change the third switch 28 from the transmission condition to the blocking condition, all substantially simultaneously, to allow energizing of illumination device 12 by the power output signal from the voltage control 16, to initiate recharging of the battery 20 by the second battery charging signal output from the voltage control 16 and to terminate powering of the illumination device 12 by the emergency electrical energy signal output of the battery 20, respectively.

It will be appreciated, therefore, that switching of the first switch 18 and third switch 28 is effected by the control means portion of the sensing and detection means 26 substantially simultaneously to switch from emergency power operation, wherein the emergency signal is provided from the battery 20 to the illumination device 12, and the normal operating condition, wherein the power for the illumination device 12 is received from the primary voltage supply 14. The functional effect of switching second switch 22 is dependent upon both the battery 20 terminal voltage and the available voltage from the primary source of electrical energy 14.

Figure 2:
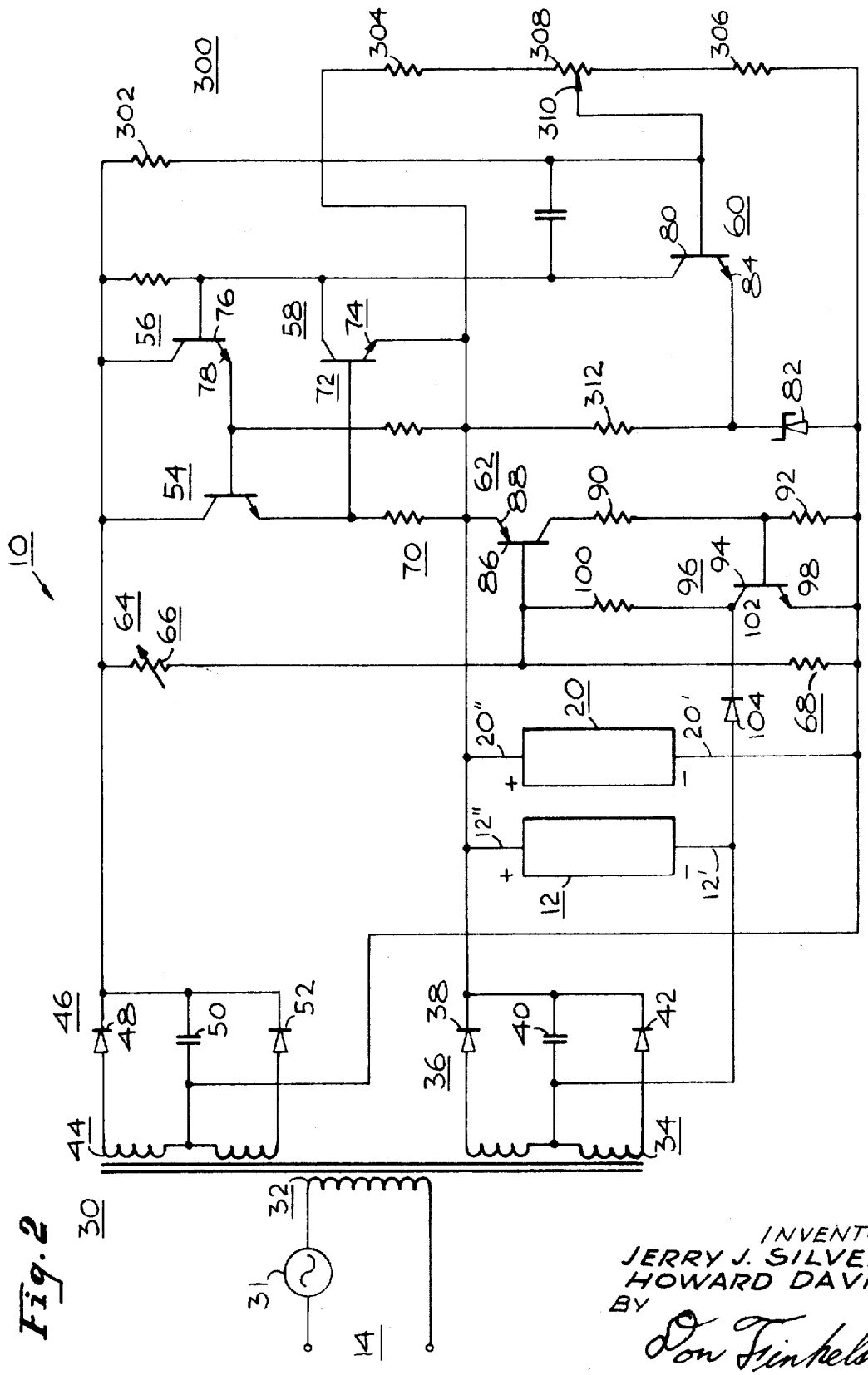
FIG. 2 is a circuit diagram illustrating the circuitry preferred by applicants for a preferred embodiment of the invention.

Referring now to FIG. 2, there is shown, in schematic diagram form, the structure associated with the preferred embodiment 10 of the invention herein to achieve the functions described above in connection with the block diagram of FIG. 1.

As shown in FIG. 2, electrical energy, which, for example, may be 120 v. AC power, from the primary source of electrical energy 14 is connected into the battery charger and power supply arrangement 10 through transformer 30 and fuse 31 at the primary 32 thereof. Transformer 30 has two secondaries, a first secondary 34 connected into a first diode rectifier filter 36 comprising a diode 38, capacitor 40 and diode 42. The second secondary 44 forms part of the second diode rectifier filter 46 comprising diode 48, capacitor 50 and diode 52.

The output from the first rectifier filter 36 provides a first voltage controlled signal or power output signal for powering the illumination device 12 during normal operation, as above defined. The output of the second rectifier filter 46 is utilized to provide the second voltage controlled signal or battery charging signal to charge the battery 20 during the normal operating mode, as above described.

The output signal from the second rectifier filter 46 is ultimately utilized to charge the battery 20, is both voltage and current controlled for input to the battery 20. Regulation of the battery charging signal is achieved by a Darlington connected pair of transistors 54 and 56, and has current amplification by means of transistor 58 and voltage amplification by means of transistor 60, as described below in greater detail.

Transistor 62 and transistor 96 are part of third switch means 28 for connecting the battery 20 to the illumination device 12 during emergency operating conditions and for preventing the transmission of the battery 20 output signal to the illumination device 12 during normal operating conditions.

A voltage divider 64 comprising resistors 66, which may be a variable resistor and 68 together with transistor 62, operate as part of the sensing and detection means 26 to detect the voltage in the primary electrical energy source 14 and initiate switching at the preselected voltage level from normal to emergency. Variable resistor 66 allows variation in the preselected voltage level, if desired. Thus, as noted above, transistor 62 is part of both the third switch means 28 and the sensing and detection means 26 to provide a dual function and thus minimize both weight, cost and complexity of applicants' improved battery charging and power supply arrangement 10.

As noted above, during normal operation, the battery 20 is charged by the output signal from the second rectifier filter network 46 and is voltage controlled as well as current controlled to ensure full charge to the battery despite variations in the voltage of the primary source of electrical energy 14. Also, it tends to prevent in-rush current from damaging the battery during the charging operation.

Current control of the battery charging signal also provides uniformly applied charging current for high-charging efficiency. Such constant current charging also reduce deleterious battery heating.

To achieve the current limiting effects in the second voltage controlled signal utilized in charging the battery 20, transistor 54 acts as a variable resistor. This compensates for random and/or rapid fluctuations that may be caused by such external stimuli as variations in the magnitude of the voltage of the primary source of electrical energy 14, the condition of the battery 20 itself, and any variable battery charging voltage control output from the second rectifier filter 46. Additionally, variations in semiconductor devices themselves, ambient temperatures, and the like, may all contribute toward conditions whereby charging of the battery could have deleterious effects upon the battery itself.

The battery charging signal flows out of the emitter of transistor 54 and through resistor 70. This generates a voltage proportional to the actual charging current of the battery. If the actual current exceeds any desired preselected current level, then the voltage across resistor 70 will exceed the barrier potential of the base 72 to emitter 74 diode configuration of transistor 58, causing transistor 58 to conduct. When transistor 58 conducts, this automatically brings the base 76 of transistor 56 to value closer to its own emitter 78. This results because of the available current to the base 76 of transistor 56 is shunted through transistor 58, leaving less available current into the base of transistor 56. By thus cutting off the supply of driving current to transistor 56, it is effectively turned off, or attenuated, resulting in a lower current flow to the battery.

The value of the resistor 70 is, of course, critical for the functioning of the current limiting control 24 and may be selected arbitrarily for any desired current limiting condition. It is only necessary to select resistor 70 so that the product of the current through resistor 70 times this resistance will equal the emitter 74 to base 72 junction voltage of transistor 58.

Voltage regulation in applicants' battery charger and power supply arrangement 10 is achieved by utilizing transistors 54, 56 and 58, as well as voltage regulation by transistor 60. The base 80 of transistor 60 receives a fraction of the total potential across the battery 20. Transistor 60 compares this voltage with the voltage of the reference diode 82 at the emitter terminal 84 of the transistor 60, and the reference voltage at the emitter terminal 84 is always at a substantially constant voltage with respect to the negative terminal 20' of the battery 20. Base 80, of course, has a potential that is varied, since it is proportional to the total battery potential. Therefor, transistor 60 varies its conductive state in accordance with the condition of the battery because of the variable potential at the base 80. When the potential across the battery 20 rises above a predetermined level, then transistor 60 becomes conductive, thus shunting current away from the base 76 of transistor 56. This achieves voltage detection and automatic voltage regulation and, as noted, transistor 56 as well as transistor 54 and 58 automatically function as both current and voltage regulators but are triggered by different elements of the circuit described above.

Since small changes in voltage and current are amplified and reintroduced into the circuit to cause comparatively large magnitude of changes, it will be appreciated that transistor 54 may comprise any number of power transistors depending upon the level of the power that is required to be monitored in order to control the current and the voltage supplied to the battery 20. Thus the balance of the circuit may remain substantially identical to that illustrated in FIG. 2 and additional transistors 54 inserted as required for the other circuit components.

The functions of the sensing and detection means 26, the first switch 18, second switch 22, and third switch 28, are achieved by circuitry including the voltage divider 64 having a center tap connnected to the base 86 of transistor 62. During normal operation when the magnitude of voltage 14 is above a preselected value, the base 86 of transistor 62 is maintained positive with respect to its emitter 88 and, therefore, transistor 62 is in a nonconductive condition. It will be noted, of course, that for the circuit arrangement shown in FIG. 2, transistor 62 is a PNP type transistor. When transistor 62 is not conductive, no current flows through resistors 90 and 92. Thus, the base 94 of transistor 96 is at the same potential as its emitter 98 and, therefore, transistor 96 is in a nonconductive state. This condition existing, the negative terminal 20' of the battery 20 is not connected to the illumination device 12 and, therefore, under normal operating conditions this achieves the function of third switch 28 by preventing the battery output signal from the battery 20 from powering the illumination device 12.

In the event that the voltage at the primary source of electrical energy 14 drops below a preselected value, the input to the primary 32 of the transformer 30 drops below a preselected value, and there is an immediate loss of current flow through the voltage divider 64 comprising resistors 66 and 68. With the loss of the voltage flow through resistors 66 and 68, the battery 20 negative terminal 20' provides a current flow through resistor 68 to the base 86 of transistor 62. This allows a current flow through the emitter 88 of transistor 62 to the positive terminal 20" of the battery 20. This, of course, turns transistor 62 to the conducting condition.

Additionally, current flow is now established through resistors 90 and 92, thus establishing the base 94 of transistor 96 as positive with respect to its emitter 98 and therefore transistor 96 is turned to a transmitting condition. With transistor 96 becoming conductive, there is a complete path from the negative terminal 20' of the battery 20 to transistor 96 through resistor 100 and into the base of transistor 62. The additional current flow through the base 86 of transistor 62 reinforces the previously mentioned current flow to the base 86 of the transistor 62 and, together, acts as a snap-on regenerative effect, so that transistors 62 and 96 act to reinforce each other, to snap the circuit into the closed position. Transistor 96 becomes thoroughly conductive with a comparatively minimal voltage drop across its emitter 98 to collector 102 junction. Therefore, there is now a closed current flow loop from the battery negative terminal 20' to transistor 96 through diode 104 and to the negative terminal 12' of the illumination device 12 to the positive terminal 12" thereof, and thus to the positive terminal 20" of the battery 20. Those skilled in the art will recognize that, due to regenerative action, there is, in effect, a "negative" resistance at transistor 96.

Transistors 62 and 96 act as a regenerative switch to ensure that once transistor 62 starts to conduct it is forced into full conduction thereby acting in a bistable state. This maintains transistor 96 in full conduction. Similarly, when transistor 62 stops conducting, both transistor 62 and transistor 96 are forced into a nonconducting state.

When the line voltage rises above the preselected value at which emergency mode operation commenced, the base 86 of transistor 62 receives current from both resistor paths through resistors 68 and 100. Therefore, the voltage drop across resistor 66 must be sufficient to provide a greater current. This necessitates that the line voltage must rise to the predetermined voltage value, above the preselected voltage value, to switch back to normal mode operation.

The functional equivalent of switching switch 22 is achieved, primarily, by the action of diodes 48 and 52. Charging of battery 20 is, of course, a function of two parameters: the first parameter being the voltage charge on the battery 20 and the second parameter being the voltage available at the secondary 44 of transformer 30, which is a measure of the available voltage from the primary source of electrical energy 14. Thus, as long as the voltage available from the primary source of electrical energy 14 is sufficient to provide a voltage value in the second secondary 44 greater than the battery 20 terminal voltage, then charging of the battery functionally occurs until the voltage available falls too low. At this point, the diodes 48 and 52 are reversed biased and thus cut off the second voltage controlled signal to terminate battery charging. This functional effect is described below in greater detail. Therefore, when the peak voltage of the stepped down AC input voltage at the second secondary 44 of transformer 30 drops below the battery 20 terminal voltage, charging of the battery is terminated. Conversely, when the voltage in the primary source of electrical energy 14 rises to a value sufficient that the peak voltage available at the second secondary 44 is greater than the terminal voltage on the battery 20, diodes 48 and 52 are forward biased and charging of the battery 20 resumes.

Resistor network 300 comprising resistors 302, 304, 306 and variable resistor 308 comprise part of the sensing and detection means 26. The network 300 has a voltage divider network for coupling the Zener diode 82 reference voltage, (through which current continuously flows by virtue of resistor 312) through transistor 60 to detect a voltage rise or drop at point 310. The voltage at point 310 reflects the line voltage from source 14 as controlled by the rectifier filters 36 and 46 and, simultaneously, the battery charge voltage condition. Thus, when the line voltage drops below a predetermined value, the voltage at point 310 drops below a preselected value and the battery charging signal is controlled in response thereto. Simultaneously, the voltage across the resistors 304, 306 and 308, which reflects the battery 20 voltage condition, also supplies a signal to point 310. Therefore the voltage at base 80 of transistor 60 is a function of both the line voltage and battery 20 charge voltage. Battery 20 is thereby charged in response to variations in either of these signals.

The desired voltage value of point 310 is adjusted by a factor setting of variable resistor 308 to achieve a desired ratio between resistor 302 and the sum of resistors 306 and 308.

It has been found that extended service life of illumination device 12 in this invention wherein it operates in both the normal and emergency mode, particularly if it comprises a filament or incandescent-type lamp, can be obtained by operation at slightly less than the nominal voltage. For example, if the illumination device 12 comprises an incandescent lamp with a nominal 12 v. rating, the output of first rectifier filter 36 for normal operation is on the order of 11.5 v. Customary emergency lighting, of course, was only utilized during comparatively low-duty cycle emergency mode and lamp life was not critical.

Also, in order to achieve a full charge on battery 20 it has been found advantageous to have a maximum charging voltage slightly greater than the nominal rating of the battery. In the above example of a 12 v. illumination device 12, the battery charging signal output from second rectifier filter 46 may be 18 v. DC regulated to 14.5 v. DC for a 12 v. nominally rated battery 20.

The diode 104 prevents reverse polarity of the transistor 96 under the condition that during a prolonged blackout the potential across the battery 20 will become virtually zero. Then, with power at the primary source electrical energy 14 restored, the voltage available at the capacitor 40 will be greater than the battery potential. Therefore, transistor 96 could be reverse polarized. To eliminate any possible damage to transistor 96, diode 104 is inserted in the circuit comprising the collector 102 to prevent current flow in this condition. Then, when battery 20 becomes fully charged, the potential of transistor 96 is restored to its normal operating condition and diode 104 merely acts as a forward conductor. It will be appreciated that the base 86 to emitter 88 diode effect of transistor 62 is compared with a fraction of the total voltage via the divider network 64 and is utilized in determining the preselected voltage level of the primary source electrical energy 14 at which switching will occur.

As discussed above, the battery charging function continues, even during emergency operation, as long as the peak voltage available at the secondary secondary 44 of transformer 30, when compared with the terminal voltage on battery 20, is sufficient to forward bias diodes 48 and 52. Similarly, during emergency operation, as long as the peak voltage available at the first secondary 34 of transformer 30 is sufficient to forward bias diodes 38 and 42, when compared with the terminal voltage on battery 20, that is, greater than the charge on battery 20, there will be a contribution of current from the source of electrical energy 14 to the illumination device 12. As long as the peak voltage available at the second secondary 34 exceeds the charge voltage on the battery 20, diodes 38 and 42 are forward biased and there is a contribution directly therefrom to the illumination device 12. This situation often occurs during "dim-out" conditions wherein the voltage available at the primary source of electrical energy fluctuates between voltages close to the terminal voltage on the battery 20.

As noted above, the invention also comprises an improved mounting arrangement for transistors to improve the heat dissipation therefrom.

It is, of course, common practice to utilize circuit boards to provide interconnections between elements of a circuit, which circuit may include transistors. Additionally, such circuit boards are often mounted in, but electrically insulated from, a case means.

Figure 3:
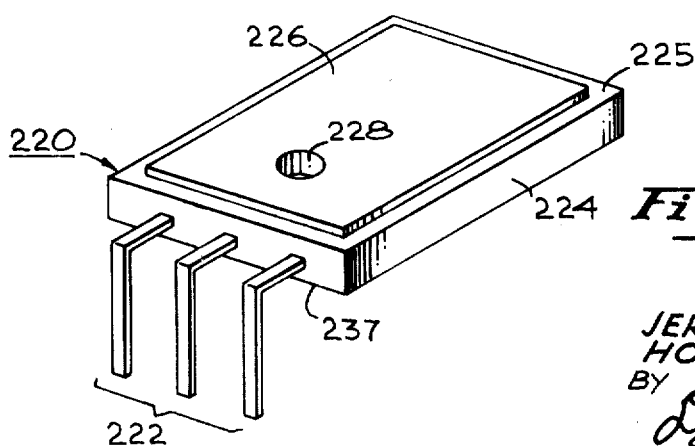
FIG. 3 is a perspective view of a transistor useful in the practice of the invention.

FIG. 3 illustrates a typical transistor 220 having a plurality of leads 222 and body 224 upon which is deposited a heat dissipation metallic coating 226. An aperture 228 is often provided to facilitate certain mounting applications.

Figure 4:
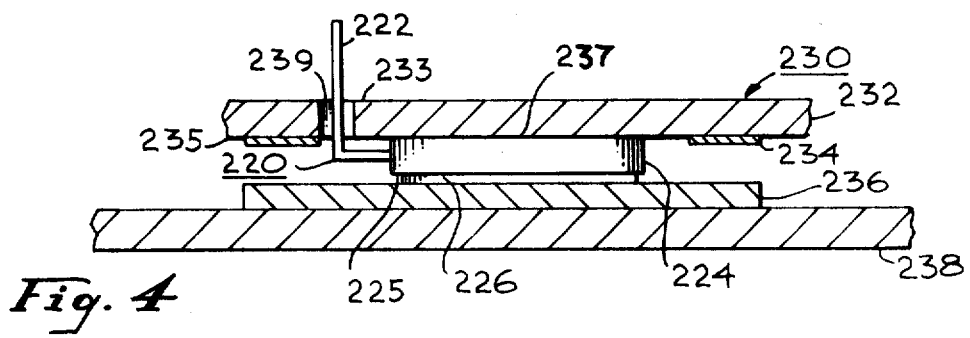
FIG. 4 illustrates a preferred mounting arrangement for transistors.

FIG. 4 illustrates a mounting arrangement according to this invention for the transistor 220 on a circuit board 230 in a metallic case means 238. The circuit board 230 has a dielectric base 232 having an upper surface 233 and a lower surface 235 upon which are provided the electrically conductive circuit connecting elements 234. The transistor 220 has an upper surface 237 that is placed in contact with the lower surface 235 of the circuit board 230 and the leads 222 project through the aperture 239 to regions adjacent the upper surface 233 of circuit board 230 to allow connection to other circuit elements.

The metallic coating 226 on the lower surface 225 c transistor 220 is adjacent a dielectric, such as mica, spacer 236 for electrically insulating the coating 226 from the case means 238. The mica spacer 236 is a good electrical insulator but also allows good conductive thermal energy transfer from the transistor 220 to the case means 238 which, in effect, acts as a heat sink. Thus, there is a direct, low thermal resistance path from transistor 220 to the case means 238 for effective heat transfer. Additionally, the transistor 220 acts as a standoff or spacer between the circuit board 230 and base means 238 thereby eliminating the need for such additional structure.

We claim:

1. A power supply arrangement for an electrically energized illumination device of the type adapted to receive electrical energy from a primary electrical energy source and supply electrical energy to the illumination device for a normal condition of operation wherein the voltage of the primary electrical energy source is above a predetermined value and for an emergency condition wherein the voltage of the primary electrical energy source is less than a preselected value which is less than the predetermined value, comprising, in combination:

voltage control means for receiving electrical energy from the primary electrical energy source and providing a first voltage controlled power input signal, and a second voltage controlled battery charging signal, and said voltage control means connected to the illumination device to transmit said first voltage controlled power output signal thereto;

battery means for receiving said second voltage controlled battery charging signal for charging said battery means, and said battery means connected to the illumination device for providing an emergency electrical energy signal thereto for the emergency condition;

a first switch means for controlling said first voltage controlled power output signal for transmitting said first voltage controlled power output signal for said first switch means in a transmitting condition, and blocking said first voltage controlled power output signal for said first switch means in a blocking condition;

a second switch means for controlling said second voltage controlled battery charging signal to transmit said battery charging signal for said second switch means in a transmitting condition, and blocking said second voltage controlled battery charging signal for said second switch means in a blocking condition;

a third switch means for controlling said emergency electrical energy signal for transmitting said emergency electrical energy signal for said third switch means in a transmitting condition, and for blocking said emergency electrical energy signal for said third switch means in a blocking condition;

voltage sensing means for sensing the magnitude of the voltage of the primary electrical energy source and battery charge condition and said voltage sensing means having control means portion for operating said first, said second and said third switch means in response to the sensed magnitude of the voltage of the primary electrical energy source and battery charge condition and said control means maintaining said first and said second switch means in said transmitting condition and said third switch means in said blocking condition for the normal condition of operation wherein the sensed magnitude of the voltage of the primary electrical energy source is greater than the preselected value, and said control means for substantially simultaneously switching said first switch means to said blocking condition and switching said third switch means to said transmitting condition for the emergency condition wherein the sensed voltage of the primary electrical energy source is less than the preselected value as the voltage of the primary electrical energy source decreases, and said control means for substantially simultaneously switching said first switch means to said transmitting condition and said third switch means to said blocking condition for said voltage of the primary electrical energy source above the predetermined value as the voltage of the primary electrical energy increases and said control means switching said second switch means between said transmitting condition and said blocking condition in response to said sensed voltage magnitude of said battery charge condition and said sensed voltage magnitude of said primary electrical energy; and voltage limiting means for limiting the maximum voltage value of said second voltage controlled battery charging signal.

2. The arrangement defined in claim 1 wherein:
said battery has a first nominal voltage rating, said illumination device has a second nominal voltage rating and said first voltage controlled power output signal has a voltage magnitude less than said second nominal voltage rating of said illumination device and said second voltage controlled battery charging signal has a voltage magnitude greater than said first nominal voltage of said battery.

3. The arrangement defined in claim 2 and further comprising:
current control means for limiting the maximum current value of said second voltage controlled battery charging signal.

4. The arrangement defined in claim 2 wherein:
the voltage magnitude of said first voltage controlled power output signal is less than said second voltage controlled battery charging signal.

5. The arrangement defined in claim 1 wherein:
said first, said second and said third switch means each comprise electrical switch means free of mechanically moving parts.

6. The arrangement defined in claim 1 and further comprising:
adjusting means for varying said preselected voltage value and said predetermined voltage value.

7. The arrangement defined in claim 1 wherein:
said control means comprises a first diode rectifier filter for providing said first voltage controlled power output signal, and a second diode rectifier filter for providing said second voltage controlled battery charging signal.

8. The arrangement defined in claim 7 wherein:
said battery has a first nominal voltage rating, said illumination device has a second nominal voltage rating, and said first voltage controlled power output signal has a voltage magnitude less than said second nominal voltage rating of said illumination device and said second voltage controlled battery charging signal has a voltage magnitude greater than said first nominal voltage of said battery.